(12) United States Patent
Mukherjee

(10) Patent No.: US 12,373,271 B2
(45) Date of Patent: Jul. 29, 2025

(54) SYSTEM AND METHOD FOR MATCHING MULTIPLE FEATURELESS IMAGES ACROSS A TIME SERIES FOR OUTAGE PREDICTION AND PREVENTION

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 127 days.

(21) Appl. No.: 18/201,817

(22) Filed: May 25, 2023

(65) Prior Publication Data
US 2024/0394127 A1    Nov. 28, 2024

(51) Int. Cl.
| | |
|---|---|
| G06F 11/00 | (2006.01) |
| G06F 11/07 | (2006.01) |
| G06V 10/74 | (2022.01) |
| G06V 10/764 | (2022.01) |
| G06V 10/82 | (2022.01) |
| G06V 20/70 | (2022.01) |

(52) U.S. Cl.
CPC ........ *G06F 11/004* (2013.01); *G06F 11/0793* (2013.01); *G06V 10/761* (2022.01); *G06V 10/764* (2022.01); *G06V 10/82* (2022.01); *G06V 20/70* (2022.01); *G06F 2201/84* (2013.01)

(58) Field of Classification Search
CPC . G06F 11/004; G06F 11/0793; G06F 2201/84
USPC ...................................................... 714/1–57
See application file for complete search history.

(56) References Cited

U.S. PATENT DOCUMENTS

| | | | |
|---|---|---|---|
| 11,625,293 B1* | 4/2023 | Ratkovic .............. | G06F 11/079 714/37 |
| 2014/0278496 A1* | 9/2014 | Spencer ................ | G16H 40/20 705/2 |

(Continued)

FOREIGN PATENT DOCUMENTS

SG    10201610116 P    6/2018

OTHER PUBLICATIONS

Dec. 27, 2024—(US) Office Action—U.S. Appl. No. 18/198,367.

(Continued)

*Primary Examiner* — Sarai E Butler
(74) *Attorney, Agent, or Firm* — Banner & Witcoff, Ltd.

(57) ABSTRACT

A computing platform may train an image comparison model to predict system failure for technology infrastructure based on telemetry state images. The computing platform may receive telemetry data for the plurality of computing systems over a period of time. The computing platform may generate, based on the telemetry data and for each parameter represented in the telemetry data, a telemetry state image, where each telemetry state image plots the period of time on an x axis, plots the plurality of computing systems on a y axis, and is specific to a respective parameter represented in the telemetry data. The computing platform may classify, using the image comparison model and using parallel processing, the telemetry state images. The computing platform may identify a likelihood of failure for the technology infrastructure, and may cause modification of operations at one or more of the plurality of computing systems to prevent a predicted failure.

20 Claims, 11 Drawing Sheets

(56) References Cited

U.S. PATENT DOCUMENTS

| | | |
|---|---|---|
| 2014/0310564 A1 | 10/2014 | Mallige et al. |
| 2015/0149134 A1 | 5/2015 | Mehta et al. |
| 2016/0041948 A1* | 2/2016 | Vichare ............... G06F 11/3452 702/181 |
| 2016/0155315 A1* | 6/2016 | McElhinney ........ G05B 23/024 340/502 |
| 2016/0266962 A1 | 9/2016 | Rajasekharan et al. |
| 2018/0157963 A1 | 6/2018 | Salti et al. |
| 2019/0139441 A1 | 5/2019 | Akella et al. |
| 2019/0179723 A1* | 6/2019 | Allin ..................... G06F 16/217 |
| 2019/0199602 A1* | 6/2019 | Zhang ....................... G06F 8/31 |
| 2020/0125465 A1* | 4/2020 | Choi ...................... G06N 3/047 |
| 2020/0201697 A1* | 6/2020 | Torng .................... G06F 11/076 |
| 2020/0295986 A1* | 9/2020 | Rathinasabapathy ..... G06F 8/65 |
| 2021/0056678 A1 | 2/2021 | Al Shehri et al. |
| 2022/0246657 A1 | 8/2022 | Lin et al. |
| 2022/0269035 A1 | 8/2022 | Kimura et al. |
| 2022/0271072 A1 | 8/2022 | Miyata |
| 2022/0295000 A1 | 9/2022 | Yamazaki et al. |
| 2022/0295006 A1 | 9/2022 | Kashiwagi |
| 2022/0310684 A1 | 9/2022 | Sakata et al. |
| 2022/0321791 A1 | 10/2022 | Lin et al. |
| 2022/0372181 A1 | 11/2022 | Iwata et al. |
| 2022/0392944 A1 | 12/2022 | Tochigi et al. |
| 2022/0399469 A1 | 12/2022 | Minari |
| 2022/0408046 A1 | 12/2022 | Katou et al. |
| 2022/0415947 A1 | 12/2022 | Hasegawa |
| 2022/0417464 A1 | 12/2022 | Tatsuzawa |
| 2023/0005981 A1 | 1/2023 | Ito et al. |
| 2023/0013149 A1 | 1/2023 | Akiyama |
| 2023/0014856 A1 | 1/2023 | Goto |
| 2023/0020741 A1 | 1/2023 | Liu et al. |
| 2023/0058009 A1 | 2/2023 | Tsuchimoto et al. |
| 2023/0073737 A1 | 3/2023 | Li et al. |
| 2023/0110102 A1 | 4/2023 | Li et al. |

OTHER PUBLICATIONS

Di Liu et al. "An Improved Dynamic Load-balancing Model" IEEE (Year 2016).

Javier Lopez et al. "A Resilient Architecture for the Smart Grid" IEEE (Year 2018).

Emre Gures "Machine Learning-Based Load Balancing Algorithms in Future Heterogeneous Networks: A Survey" IEEE (Year 2022).

Li Liu et al. "Fault Detection, Diagnostics, and Prognostics: Software Agent Solutions" (Year 2007).

Areeg Samir et al. "A Controller Architecture for Anomaly Detection, Root Cause Analysis and Self-Adaptation for Cluster Architectures" Year 2019.

Qing Wang et al. "Constructing the Knowledge Base for Cognitive IT Service Manaement" (Year 2017).

* cited by examiner

SYSTEM AND METHOD FOR MATCHING MULTIPLE FEATURELESS IMAGES ACROSS A TIME SERIES FOR OUTAGE PREDICTION AND PREVENTION

BACKGROUND

In some instances, applications may rely on a technology infrastructure to ensure their operation. Accordingly, it may be important to create a reliable technology infrastructure and minimize the occurrence of any corresponding failures/outages. In some instances, a current system performance may be analyzed to identify a likelihood of failure. In some instances, however, a series of previous events occurring in a time series leading up to a current time may be relevant to the analysis. In failing to consider such information, an accuracy of failure detection may be reduced. In some instances, however, considering such a time series of events may be a slow, unparallelizable, and computationally inefficient process. Accordingly, it may be important to improve the process of preemptive failure detection to prevent system failures and/or outages.

SUMMARY OF THE INVENTION

Aspects of the disclosure provide effective, efficient, scalable, and convenient technical solutions that address and overcome the technical problems associated with system failure prediction and prevention. In accordance with one or more embodiments of the disclosure, a computing platform comprising at least one processor, a communication interface, and memory storing computer-readable instructions may train an image comparison model to predict system failure for technology infrastructure based on telemetry state images, each telemetry state image depicting change in a respective telemetry parameter for a plurality of computing systems of the technology infrastructure over time. The computing platform may receive telemetry data for the plurality of computing systems over a period of time. The computing platform may generate, based on the telemetry data and for each parameter represented in the telemetry data, a telemetry state image, where each telemetry state image: plots the period of time on an x axis, plots the plurality of computing systems on a y axis, and is specific to a respective parameter represented in the telemetry data. The computing platform may classify, using the image comparison model and using parallel processing, the telemetry state images. The computing platform may identify, using the parallel processing and based on the classifications of the telemetry state images, a likelihood of failure for the technology infrastructure. The computing platform may send, based on the likelihood of failure for the technology infrastructure, one or more preemptive resolution commands causing modification of operations at one or more of the plurality of computing systems to prevent a predicted failure.

In one or more instances, training the image comparison model may include training the image comparison model to classify input telemetry data state images as matching historical telemetry state images. In one or more instances, the historical telemetry state images may be labelled based on historical failures corresponding to the respective historical telemetry state images.

In one or more examples, training the image comparison model may include training the image comparison model to identify the likelihood of failure of the technology infrastructure based on the labelled historical telemetry state images. In one or more examples, the image comparison model may include one or more of: a deep learning model or a structural property comparison model.

In one or more instances, the deep learning model may include a convolutional neural network (CNN). In one or more instances, the structural property comparison model may be configured to compare one or more of: a number of peaks and troughs, a total area of the peaks and the troughs, a center of gravity, a moment, or a spatial frequency.

In one or more examples, the computing platform may compare the likelihood of failure to a failure threshold, where sending the one or more preemptive resolution commands causing modification of the operations at one or more of the plurality of computing systems to prevent the predicted failure may be in response to identifying that the likelihood of failure meets or exceeds the failure threshold. In one or more examples, sending the one or more preemptive resolution commands may include directing a load management server associated with the one or more of the plurality of computing systems to redirect incoming requests away from the one or more of the plurality of computing systems.

In one or more instances, sending the one or more preemptive resolution commands may include directing a user device to display a recommended solution to avoid the predicted failure along with a prompt for whether or not the recommended solution should be executed. In one or more instances, the computing platform may receive user input accepting the recommended solution. The computing platform may execute, in response to receiving the user input, the recommended solution.

In one or more examples, the computing platform may receive additional telemetry data for the plurality of computing systems over a second period of time, where the second period of time includes a portion of the period of time and an amount of time occurring after the period of time. The computing platform may generate, based on the additional telemetry data and for each of the parameters, an additional telemetry state image, where each additional telemetry state image may be a time series representation of the respective parameters for the plurality of computing systems over the second period of time. The computing platform may classify, using the image comparison model and using the parallel processing, the additional telemetry state images. The computing platform may update, using the parallel processing and based on the classifications of the additional telemetry state images, the likelihood of failure for the technology infrastructure.

In one or more instances, the parallel processing may include classifying, in parallel and at substantially the same time, the telemetry state images for each of the parameters, and identifying, in parallel and at substantially the same time, the likelihood of failure based on each of the classifications.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to a fast, efficient, and parallelizable system and method for matching multiple featureless images across a time series, as is described further below. Preventing and predicting outages for a technology infrastructure may be important to ensure that the backbone of customer and employee facing applications maintain operations and avoid downtime. The outage prediction often involves not just looking at the current status of the overall system, but a series of other events that might have led to the current status. Predicting whether the current status is safe or may lead to some unsafe condition leading to outages may involve taking the series of statuses coming at multiple time intervals.

The current status of the system may be represented by a heatmap, which may be a type of featureless image without any discernible features or shapes. In some instances, matching featureless images such as heatmaps across time series may be a slow and unparallelizable method since each image may correspond to one time interval. For the purpose of computational efficiency, it may be important to develop a fast and parallelizable method for matching images across different time intervals.

Accordingly, described herein is a solution that uses thermal images that capture the overall health and capacity of the whole infrastructure system. A thermal image may be created by starting with a table of raw telemetry data. The data may be further normalized to convert each cell value between zero and one in floating point numbers. The resulting matrix may be referred to as a normalized image. Examples of this normalized image may be displayed by appropriate thresholding and associating a color with each of the threshold ranges. Some examples of such normalized images are displayed in diagram 800 of FIG. 8 and diagram 900 of FIG. 9.

These normalized images may represent the overall health of the system and may be directly attributed and linked to any events, incidents, and consequently, any alerts generated. The heatmap or thermal images of different times following each other may be considered to predict any potential outages, and steps may be taken to mitigate or prevent potential outages accordingly.

Figure 7:
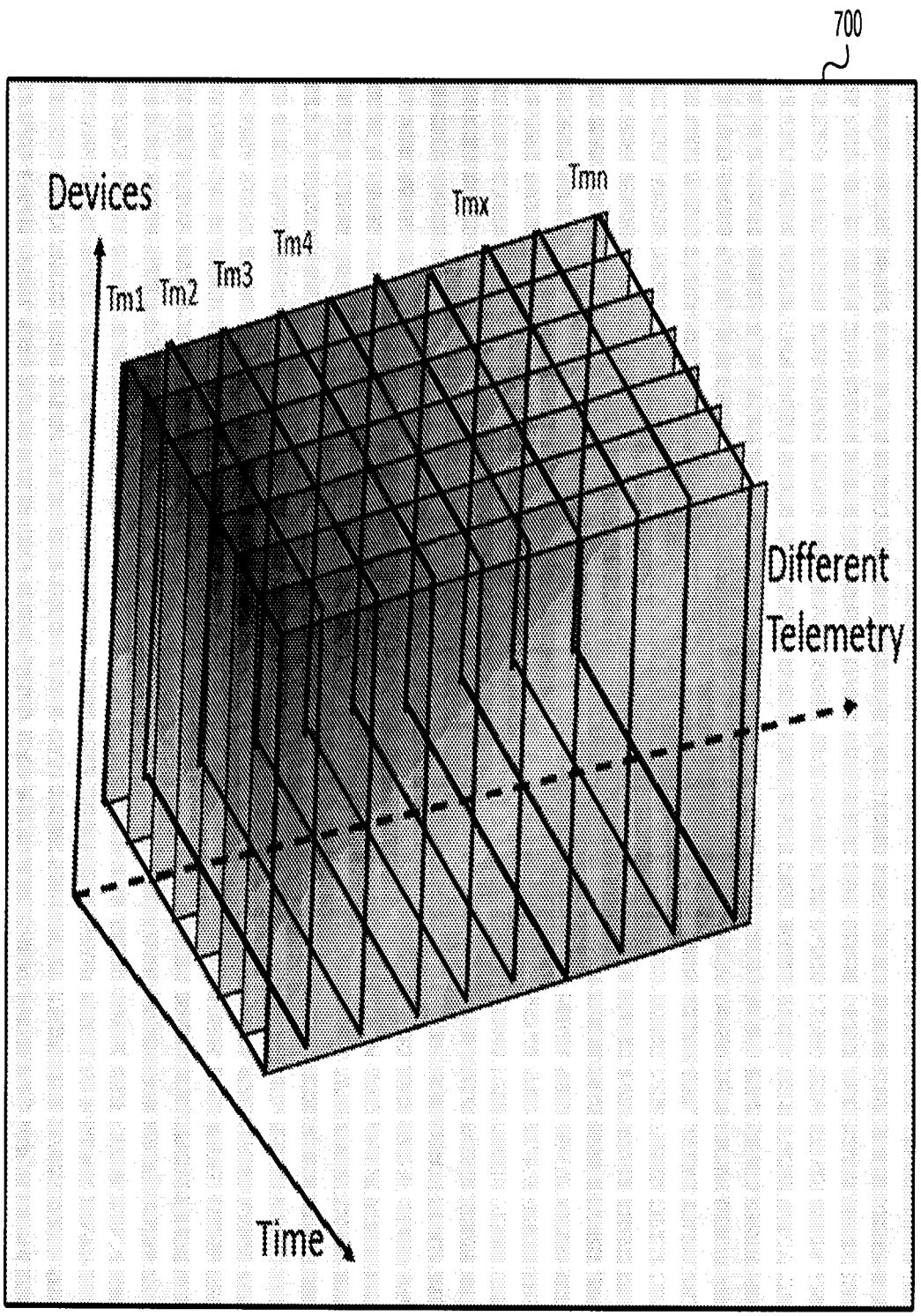
FIGS. 7-9 depict illustrative diagrams for matching multiple featureless images across a time series for outage prediction and prevention in accordance with one or more example embodiments.

Diagram 700 of FIG. 7 shows different snapshots of telemetry data along the time scale. Rather than creating a snapshot that plots devices against telemetry data, we can consolidate different snapshots for each column of the telemetry by plotting the same telemetry data for different devices over time.

Figure 8:
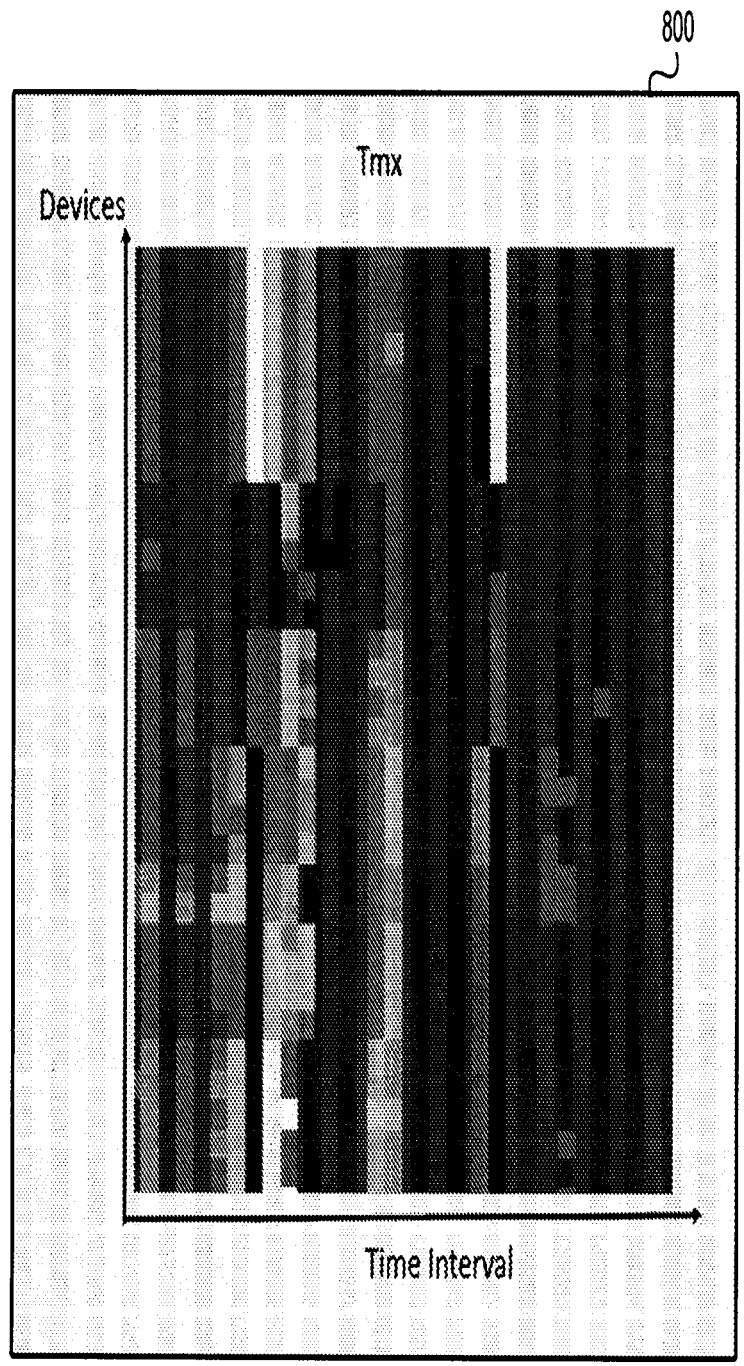

For example, the diagram 700 of FIG. 7 shows how the three dimensional view of different snapshots over time can now be viewed as device vs. time snapshots for each type of the telemetry data. Diagram 800 of FIG. 8 shows one such snapshot for telemetry data column Tmx. The advantage of this kind of view is that the image now covers the whole time interval together and can be processed at the same time.

Figure 9:
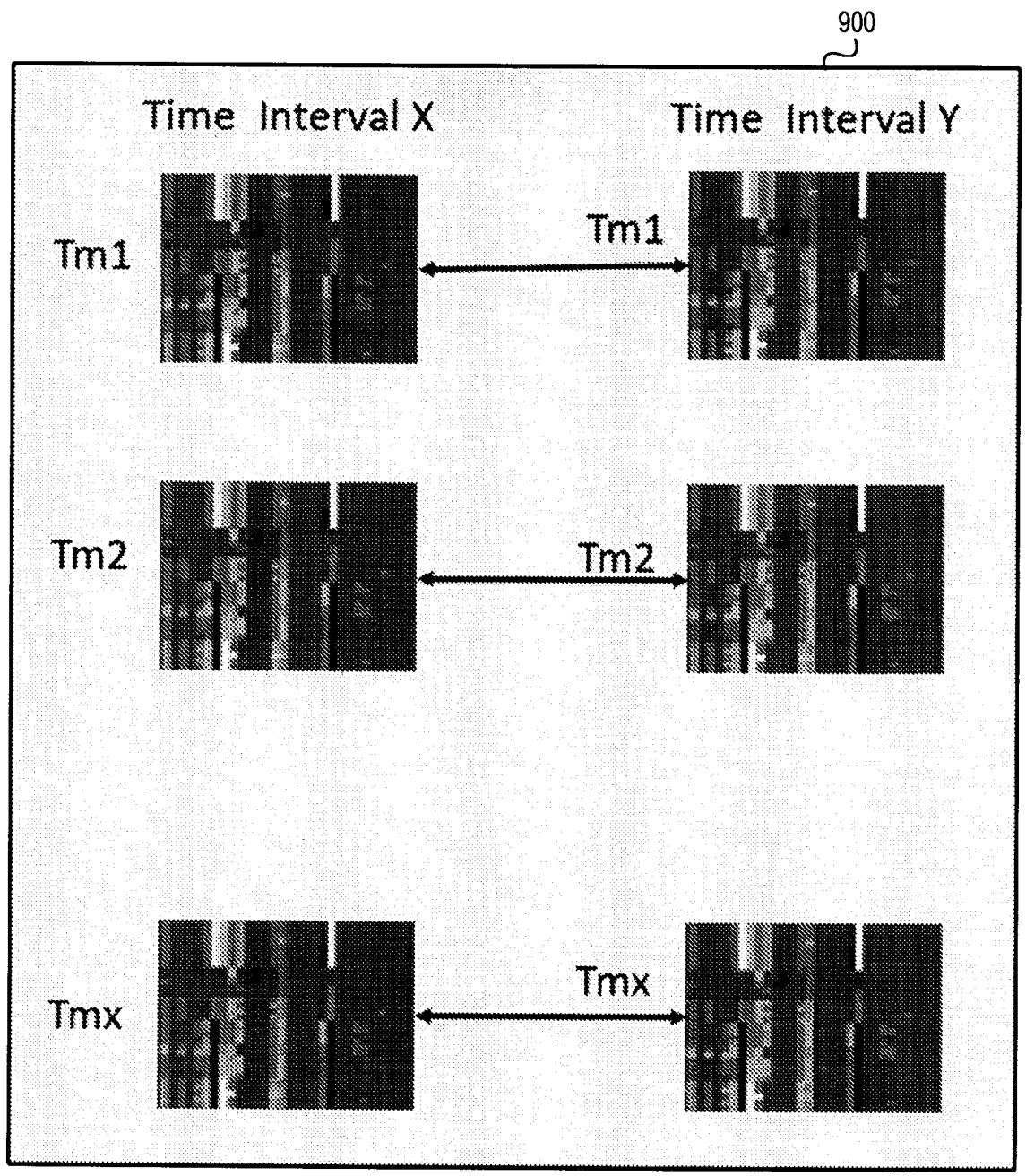

Diagram 900 of FIG. 9 shows how two different time intervals, (e.g., Interval X and Interval Y) can be easily compared. For each of the time intervals, a devices vs. time snapshot may be created for each column of the telemetry data.

Diagram 900 of FIG. 9 shows how the snapshots of different telemetry columns may be compared. For example, a snapshot of Tm1 is compared with the same telemetry data at different intervals.

Since each telemetry column may be independent of one another, each of the comparisons may be done simultaneously in a parallel machine or a GPU based device. These and other features are described in greater details below.

Figure 1A:
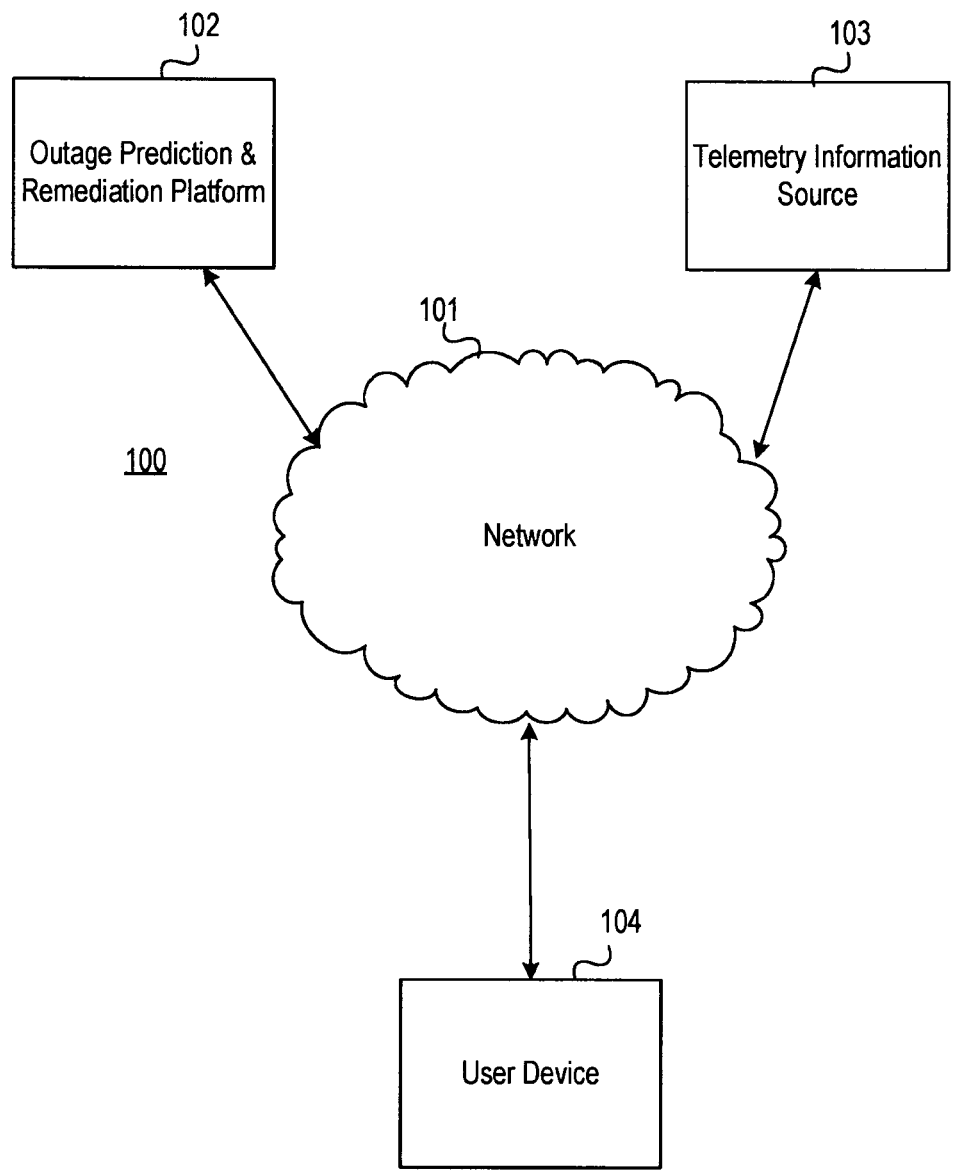
FIGS. 1A and 1B depict an illustrative computing environment for matching multiple featureless images across a time series for outage prediction and prevention in accordance with one or more example embodiments.
Figure 1B:
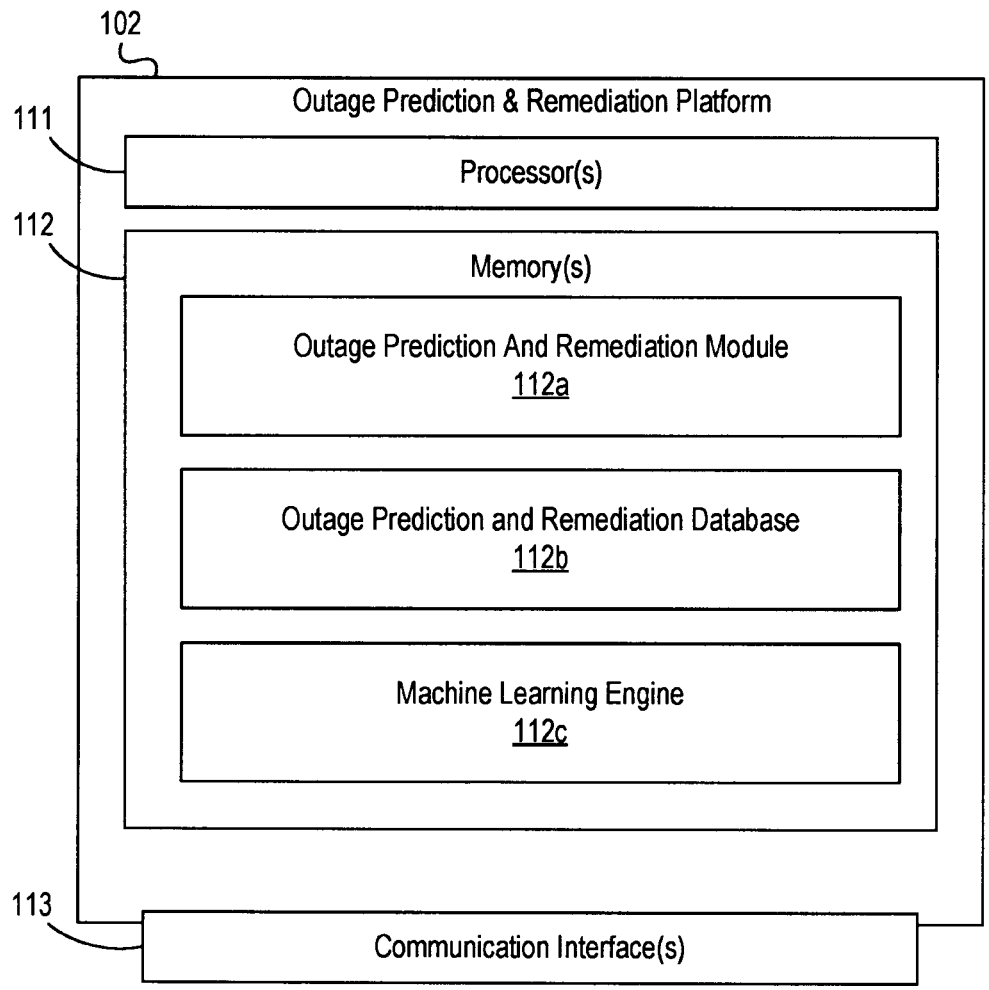

FIGS. 1A-1B depict an illustrative computing environment for matching multiple featureless images across a time series for outage prediction and prevention in accordance with one or more example embodiments. Referring to FIG. 1A, computing environment 100 may include one or more computer systems. For example, computing environment 100 may include an outage prediction and remediation platform 102, telemetry information source 103, and user device 104.

Outage prediction and remediation platform 102 may include one or more computing devices and/or other computer components (e.g., processors, memories, communication interfaces, or the like). For example, the outage prediction and remediation platform 102 may be configured to generate, update, and/or otherwise maintain a deep learning model that includes a convolutional neural network (CNN). In some instances, the CNN may be trained to classify state images based on historical state images, and to identify a likelihood of failure based on the classification. For example, the CNN may further include labels corresponding to a likelihood of failure for a given state image based on the identified matching image. Additionally or alternatively, the outage prediction and remediation platform 102 may generate, update, and/or otherwise maintain a model configured to classify images based on structural properties of the images. In either instance, based on the identified likelihood of failure, the outage prediction and remediation platform 102 may be configured to trigger preemptive resolution actions to avoid any predicted failures.

Telemetry information source 103 may be or include one or more computing devices (e.g., servers, server blades, or the like) and/or other computer components (e.g., processors, memories, communication interfaces, and/or other components). In some instances, the telemetry information source 103 may be configured to monitor a plurality of individual systems to collect the corresponding telemetry data. In other instances, the telemetry information source 103 may be the source of the telemetry data itself (e.g., producing the telemetry data). Although a single telemetry information source 103 is shown, any number of telemetry information sources 103 may be included in the system architecture without departing from the scope of the disclosure.

User device 104 may be or include one or more devices (e.g., laptop computers, desktop computer, smartphones, tablets, and/or other devices) configured for use in receiving preemptive resolution information from the outage prediction and remediation platform. In some instances, the user device 104 may be configured to display graphical user interfaces (e.g., preemptive resolution information, or the like). Any number of such user devices may be used to implement the techniques described herein without departing from the scope of the disclosure.

Computing environment 100 also may include one or more networks, which may interconnect outage prediction and remediation platform 102, telemetry information source 103, and user device 104. For example, computing environment 100 may include a network 101 (which may interconnect, e.g., outage prediction and remediation platform 102, telemetry information source 103, and user device 104).

In one or more arrangements, outage prediction and remediation platform 102, telemetry information source 103, and user device 104 may be any type of computing device capable of receiving a user interface, receiving input via the user interface, and communicating the received input to one or more other computing devices. For example, outage prediction and remediation platform 102, telemetry information source 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of outage prediction and remediation platform 102, telemetry information source 103, and user device 104 may, in some instances, be special-purpose computing devices configured to perform specific functions.

Referring to FIG. 1B, outage prediction and remediation platform 102 may include one or more processors 111, memory 112, and communication interface 113. A data bus may interconnect processor 111, memory 112, and communication interface 113. Communication interface 113 may be a network interface configured to support communication between outage prediction and remediation platform 102 and one or more networks (e.g., network 101, or the like). Memory 112 may include one or more program modules having instructions that when executed by processor 111 cause outage prediction and remediation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of outage prediction and remediation platform 102 and/or by different computing devices that may form and/or otherwise make up outage prediction and remediation platform 102. For example, memory 112 may have, host, store, and/or include outage prediction and remediation module 112a, outage prediction and remediation database 112b, and machine learning engine 112c. Outage prediction and remediation module 112a may have instructions that direct and/or cause outage prediction and remediation platform 102 to execute advanced optimization techniques to generate, apply, and/or otherwise maintain a deep learning and/or structural property based model for predicting and remediating potential system failures. Outage prediction and remediation database 112b may store information used by outage prediction and remediation module 112a, in executing, generating, applying, and/or otherwise maintaining a deep learning and/or structural property based model for predicting and remediating potential system failures and/or in performing other functions. Machine learning engine 112c may be used to train, deploy, and/or otherwise refine models used to support functionality of the outage prediction and remediation module 112a through both initial training and one or more dynamic feedback loops, which may, e.g., enable continuous improvement of the outage prediction and remediation platform 102 and further optimize the prediction and remediation of system failures.

Figure 2A:
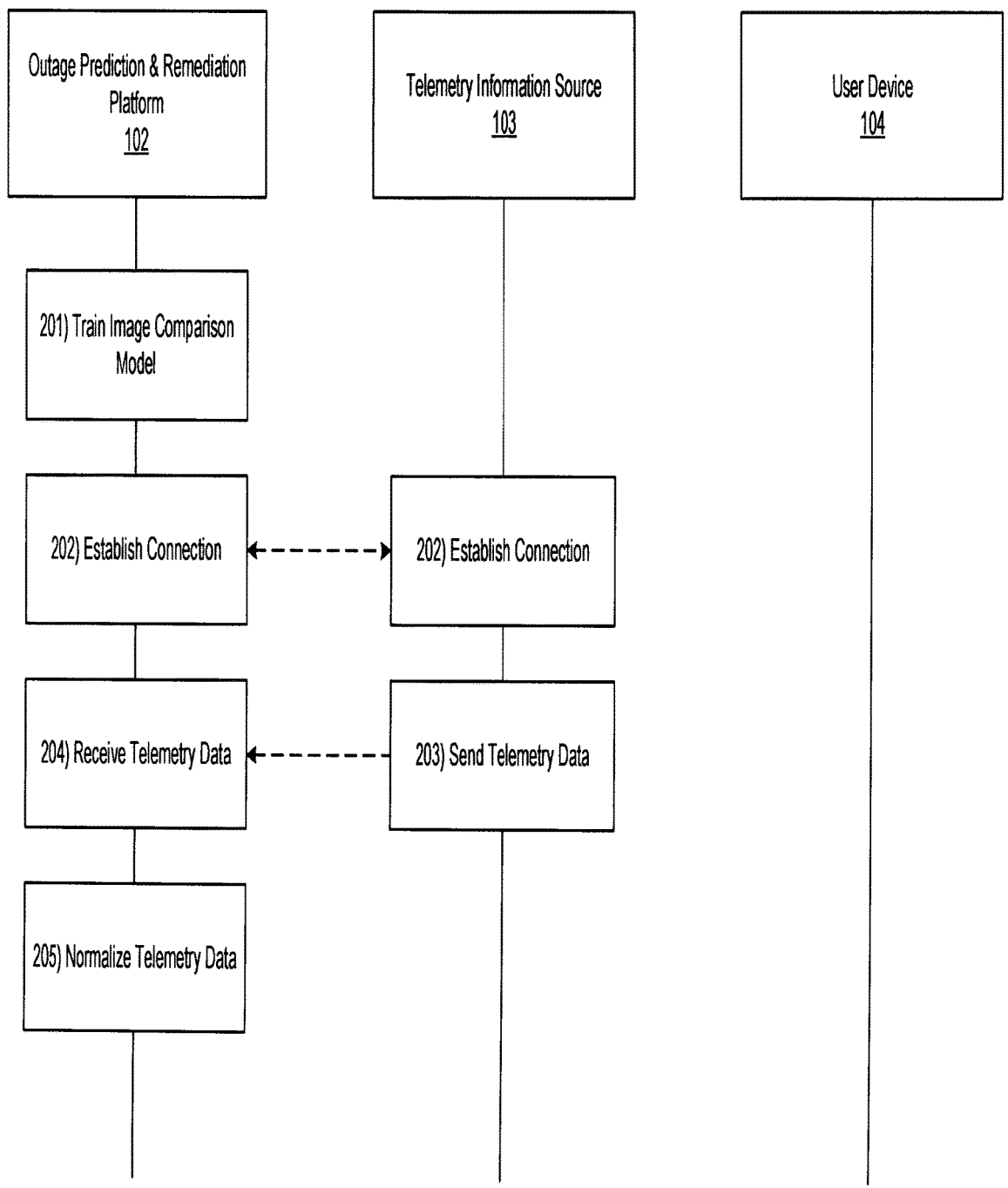
FIGS. 2A-2C depict an illustrative event sequence for matching multiple featureless images across a time series for outage prediction and prevention in accordance with one or more example embodiments.
Figure 2B:
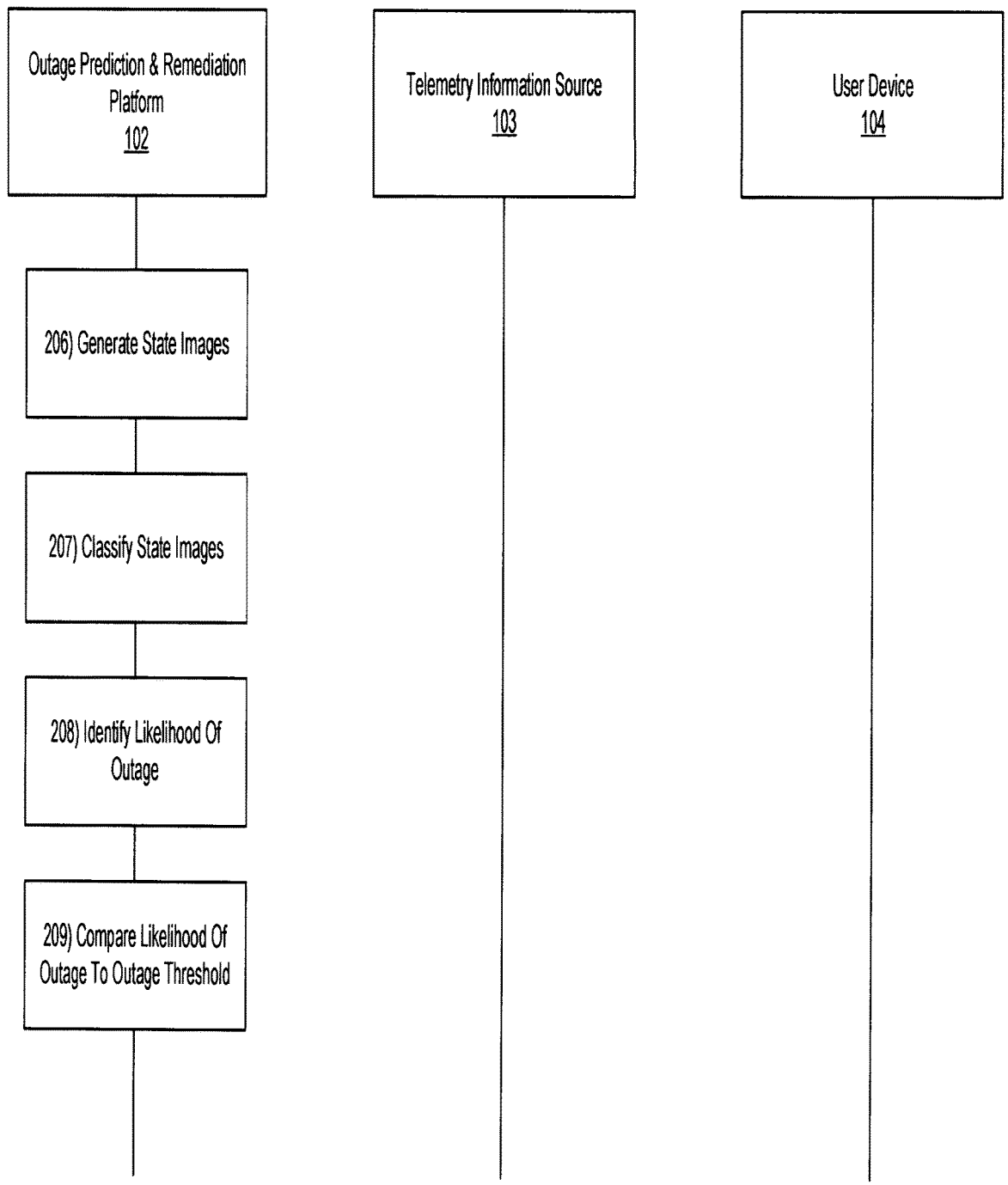
Figure 2C:
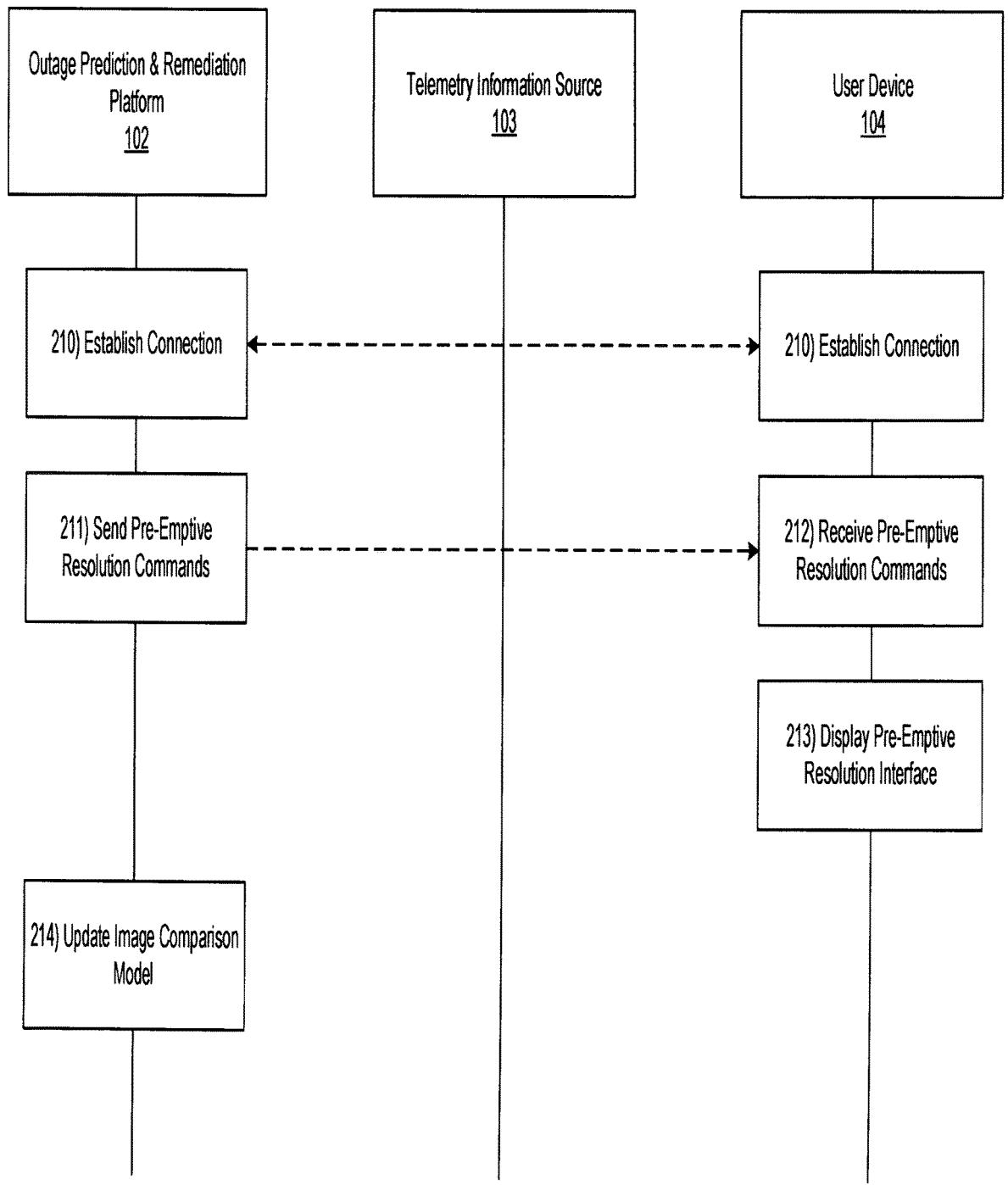

FIGS. 2A-2C depict an illustrative event sequence for matching multiple featureless images across a time series for outage prediction and prevention in accordance with one or more example embodiments. Referring to FIG. 2A, at step 201, the outage prediction and remediation platform 102 may train a deep learning model. For example, the outage prediction and remediation platform 102 may receive historical telemetry data (e.g., from the telemetry information source 103, and/or otherwise). The outage prediction and remediation platform 102 may normalize the historical telemetry data to create normalized telemetry data values between zero and one (e.g., in floating point numbers). Based on the normalized telemetry data, the outage prediction and remediation platform 102 may generate telemetry state images, similar to the normalized images depicted in FIGS. 8 and 9. The outage prediction and remediation platform 102 may use these normalized images to train a CNN to cluster and/or otherwise classify input images based on these historical telemetry state images used to train the model. For example, by inputting these normalized images into the CNN, the outage prediction and remediation platform 102 may train the CNN to recognize features in telemetry state images that may enable the CNN to perform image matching between newly input and historical telemetry state images. In some instances, the outage prediction and remediation platform 102 may train the CNN using unsupervised techniques to categorize the historical images. In other instances, the outage prediction and remediation platform 102 may train the CNN using partially supervised techniques to categorize the historical images.

Additionally or alternatively, the outage prediction and remediation platform 102 may train a structural property comparison model. For example, the outage prediction and remediation platform 102 may use the same historical telemetry state images as described above, and may classify corresponding system performance based on a categorization (e.g., low, medium, critical, or the like), a performance score range (e.g., 0-60, 60-75, 75-80, 80-94, or the like), a binary representation of pass versus fail (e.g., 0 or non-zero, or the like), and/or otherwise. In some instances, the outage prediction and remediation platform 102 may perform such categorization based on one or more performance metrics (e.g., processing speed, available processing resource, system load, or the like). Once performance has been classified, it may be represented over time using different colors/shades.

In either event, the outage prediction and remediation platform 102 may feed labelled historical thermal images (e.g., telemetry state images) into the image comparison model (e.g., labelled based on a threat level, likelihood of failure, or the like). In doing so, outage prediction and remediation platform 102 may train the image comparison model to establish stored correlations between the historical images and their corresponding label information, which may, e.g., enable the image comparison model to establish a correlation between input telemetry state images and corresponding threat levels so as to classify such telemetry state images based on the threat levels (e.g., to avoid system failures/outages based on processing speed, outage rates, failure rates, available CPU, and/or other criteria). In some instances, these correlations may include exact matches between telemetry state images, and thus an exact likelihood of outage may be identified. For example, the outage prediction and remediation platform 102 may train the image comparison model to identify matches between various features of the telemetry state images such as image peaks and troughs (e.g., number of peaks and troughs, total areas of peaks and troughs, or the like), center of gravity, moment, spatial frequency, and/or other features.

For example, two images may have the same number of peaks and troughs, but the total areas of these shapes may be different. In these instances, the image comparison model may be trained to distinguish between these thermal images.

As another example, two images may have the same center of gravity, but a different number of peaks. Alternatively, two images may have the same number of peaks, but may have a different center of gravity. In these instances, the image comparison model may be trained to distinguish between these thermal images.

As another example, images may have the same center of gravity, but may have different moments. In these instances, the image comparison model may be trained to distinguish between these thermal images.

As another example, images may have the same center of gravity and moments, but may have different spatial frequencies. In these instances, the image comparison model may be trained to distinguish between these thermal images.

Although the features of peaks and troughs, moment, center of gravity, and spatial frequency are explicitly described above, this is for illustrative purposes, and other features may be used without departing from the scope of the disclosure.

In some instances, the outage prediction and remediation platform 102 may train the image comparison model to identify non-exact (e.g., fuzzy) matches based on a certain percentage of matching thermal image features (e.g., despite an exact match not being available) and/or based on analysis of the CNN. For example, the outage prediction and remediation platform 102 may predict the fuzzy match in the event that an exact match is not identified. In some instances, the outage prediction and remediation platform 102 may generate a similarity score between the input telemetry state images and the historical telemetry state images. If the similarity score exceeds a predetermined similarity threshold, the outage prediction and remediation platform 102 may identify a fuzzy match. In these instances, if a corresponding classification is ultimately identified through a fuzzy match, the outage prediction and remediation platform 102 may train the image comparison model to identify a correlation between the corresponding telemetry state image and the classification (e.g., by refining the model using a dynamic feedback loop, as is described further below with regard to step 213). In doing so, the outage prediction and remediation platform 102 may conserve computing resources by avoiding an extensive alternative evaluation to identify outputs where no exact match is identified.

In some instances, in training the image comparison model, the outage prediction and remediation platform 102 may train a supervised learning model. For example, the outage prediction and remediation platform 102 may train one or more of: decision trees, ensembles (e.g., boosting, bagging, random forest, or the like), neural networks, linear regression models, artificial neural networks, logistic regression models, support vector machines, and/or other supervised learning models. In some instances, the outage prediction and remediation platform 102 may train the image comparison model using one or more unsupervised learning techniques (e.g., classification, regression, clustering, anomaly detection, artificial neutral networks, and/or other supervised models/techniques). Accordingly, the image comparison model may ultimately be trained to classify telemetry state images based on their similarity to historical thermal telemetry state images, which may, e.g., effectively label the new telemetry state images with the corresponding classification of the matching historical telemetry state images (which may, e.g., be indicative of system/application performance, such as a label of "low," "medium," or "critical" threat of system failure, score indicating a likelihood of failure, and/or other information).

With further reference to FIG. 2A, at step 202, the telemetry information source 103 may establish a connection with the outage prediction and remediation platform 102. For example, the telemetry information source 103 may establish a first wireless data connection with the outage prediction and remediation platform 102 to link the telemetry information source 103 to the outage prediction and remediation platform 102 (e.g., in preparation for sending telemetry information). In some instances, the telemetry information source 103 may identify whether or not a connection is already established with the outage prediction and remediation platform 102. If a connection is already established with the outage prediction and remediation platform 102, the telemetry information source 103 might not re-establish the connection. If a connection is not yet established with the outage prediction and remediation platform 102, the telemetry information source 103 may establish the first wireless data connection as described herein.

At step 203, the telemetry information source 103 may send telemetry data to the outage prediction and remediation platform 102. For example, the telemetry information source 103 may send time stamps, dates, system names, computer processing unit (CPU) information, memory information, and/or other telemetry information corresponding to performance of a plurality of systems (and/or the telemetry information source 103 itself), which may, e.g., correspond to a given period of time. In some instances, the telemetry information source 103 may send the telemetry data while the first wireless data connection is established.

At step 204, the outage prediction and remediation platform 102 may receive the telemetry data sent at step 203. For example, the outage prediction and remediation platform 102 may receive the telemetry data via the communication interface 113 and while the first wireless data connection is established.

At step 205, the outage prediction and remediation platform 102 may normalize the telemetry data received at step 204. For example, the outage prediction and remediation platform 102 may convert the telemetry data (which may, e.g., include values of different sizes, ranges, or the like) to values between zero and one. In doing so, the outage prediction and remediation platform 102 may configure the telemetry data for representation as telemetry state images.

Referring to FIG. 2B, at step 206, the outage prediction and remediation platform 102 may generate telemetry state images using the normalized telemetry data. For example, the outage prediction and remediation platform 102 may generate an image similar to the diagram 800 depicted in FIG. 8. For example, the telemetry state images may include the telemetry data for the plurality of devices plotted against time. In these instances, each telemetry state image may correspond to a particular telemetry parameter (e.g., a particular data type, a particular column of the telemetry data, or the like). For example, as depicted in diagram 900 in FIG. 9, for the time interval X, a number of telemetry state images may be generated, each corresponding to a different telemetry parameter (e.g., Tm1, Tm2, Tmx, Tmn, or the like). Specifically, the telemetry state images may represent a heatmap corresponding to a current status of a technology infrastructure that includes the plurality of the systems corresponding to the telemetry data. In essence, the telemetry state images may be snapshot representations of the performance of these systems, with regard to a particular parameter, over time. For example, as shown in diagram 700 of FIG. 7, the telemetry data may be plotted on a three dimensional graph that includes the plurality of devices, time, and the different telemetry parameters. Rather than generating telemetry state images that each represent a different point in time and that plot the devices on the Y axis and telemetry parameters on the X axis, the outage prediction and remediation platform 102 may generate telemetry state images that each represent the telemetry data for a given parameter (e.g., Tm1-Tmn), where each plot includes the plurality of devices on the Y axis and the time on the X axis.

In some instances, in generating the telemetry state images, the outage prediction and remediation platform 102 may apply one or more thresholding techniques. As a simple example, the outage prediction and remediation platform 102 may use green to represent any values from 0-3 (inclusive), yellow to represent any values from 3.1-6 (inclusive), and red to represent any values from 6.1-10 (inclusive). Any number of colors and/or threshold ranges may be implemented without departing from the scope of the disclosure.

At step 207, the outage prediction and remediation platform 102 may classify the telemetry state images using the CNN and/or structural property comparison. For example, the outage prediction and remediation platform 102 may input the telemetry state images into the CNN, which may, e.g., identify matching historical telemetry state images by comparing features of the state images. In some instances, the CNN may identify an exact match. In other instances, the CNN may identify a threshold match (e.g., at least a threshold level match).

In some instances, in classifying the telemetry state images, the CNN may receive images in a spatial domain, and may convert (e.g., using a first Fourier transform or otherwise) the images into the frequency domain. In doing so, the CNN may make translations, rotations, inversions, and/or other features of the images invariant, which may, e.g., increase both a speed and an accuracy at which the CNN may classify the images.

In addition or as an alternative to the CNN classification, the outage prediction and remediation platform 102 may use the image comparison model to perform a comparison of structural properties of the telemetry state images to the historical telemetry state images. For example, the outage prediction and remediation platform 102 may input the telemetry state images, generated at step 206, into the image comparison model to produce a classification for the current telemetry state images. For example, the image comparison model may compare structural properties (e.g., peaks and troughs, center of gravity, moment spatial frequency, and/or other features) of the current telemetry state images to those of the historical telemetry state images stored in the image comparison model.

In either instance, because each telemetry state image is a time series representation of a particular telemetry parameter, the telemetry state images may be classified using parallel processing, which may, e.g., enable the near simultaneous classification of the telemetry state images.

At step 208, after classifying the telemetry state images, the outage prediction and remediation platform 102 may identify a likelihood of outage. For example, if the image comparison model identifies that a similarity or matching score with a particular historical telemetry state image exceeds a predetermined matching threshold, the comparison model may classify a given telemetry state image along with the matching historical telemetry state image (which may, e.g., include assigning a label based on the classification). For example, the image comparison model may classify a given telemetry state image as indicating a low likelihood of failure, medium likelihood of failure, or critical state (e.g., where likelihood of failure may be high). Additionally or alternatively, the image comparison model may classify a given telemetry state image with a performance score (e.g., a score of the corresponding historical telemetry state image), which may, e.g., indicate a likelihood of failure and/or other system performance, and where a lower score may indicate worse performance than a higher score.

In some instances, the classification may also include a corresponding network action (e.g., used to remedy a corresponding system/application failure associated with the matching historical telemetry state image). For example, the classification may include a network action such as redirect network traffic, reduce system load, halt processing, send alerts, provide administrator feedback, and/or other actions.

As described above with regard to classification of the telemetry state images, because each telemetry state image is a time series representation of particular telemetry parameter, the telemetry state images may be classified and a corresponding likelihood of failure may be identified using parallel processing, which may, e.g., enable the near simultaneous classification and scoring of the telemetry state images.

At step 209, the outage prediction and remediation platform 102 may compare the likelihood of failure to one or more failure thresholds. In some instances, the failure thresholds may represent numeric values (e.g., against which numeric representations of the likelihood of failure may be compared), warning thresholds (e.g., a particular warning label in a series of warning labels, increasing in severity, against which such likelihood of failure warning labels may be compared), and/or otherwise. In some instances, if the outage prediction and remediation platform 102 identifies that the likelihood of failure meets or exceeds the threshold, the outage prediction and remediation platform 102 may proceed to step 210. Otherwise, if the outage prediction and remediation platform 102 identifies that the likelihood of failure does not meet or exceed the threshold, the outage prediction and remediation platform 102 may proceed to step 214.

Referring to FIG. 2C, at step 210, the outage prediction and remediation platform 102 may establish a connection with the user device 104. For example, the outage prediction and remediation platform 102 may establish a second wireless data connection with the user device 104 to link the outage prediction and remediation platform 102 to the user device 104 (e.g., in preparation for sending pre-emptive resolution commands). In some instances, the outage prediction and remediation platform 102 may identify whether or not a connection is already established with the user device 104. If a connection is already established with the user device 104, the outage prediction and remediation platform 102 might not re-establish the connection. If a connection is not yet established with the user device 104, the outage prediction and remediation platform 102 may establish the second wireless data connection as described herein.

At step 211, the outage prediction and remediation platform 102 may send one or more preemptive resolution commands to the user device 104. For example, the outage prediction and remediation platform 102 may, in some instances, identify, based on the identified matching pattern, one or more actions used to resolve the failure (which, in the example of the telemetry state machine images of the image comparison model may have actually occurred, but may, in the example of the newly input/classified telemetry state machine images be predicted to occur). Accordingly, the outage prediction and remediation platform 102 may effectively identify, based on previously performed corrective actions for a given failure, actions that may be performed to preemptively avoid the failure (which may, e.g., be predicted to occur).

In some instances, the outage prediction and remediation platform 102 may identify a confidence level corresponding to the likelihood of failure. In some instances, this may be based on a matching level identified by the outage prediction and remediation platform 102 corresponding to the input telemetry state images and the historical telemetry state images (e.g., by the CNN and/or through the structural property comparison). Additionally or alternatively, this may be based on a confidence that the identify remediation action will preemptively avoid the predicted failure.

Figure 4:
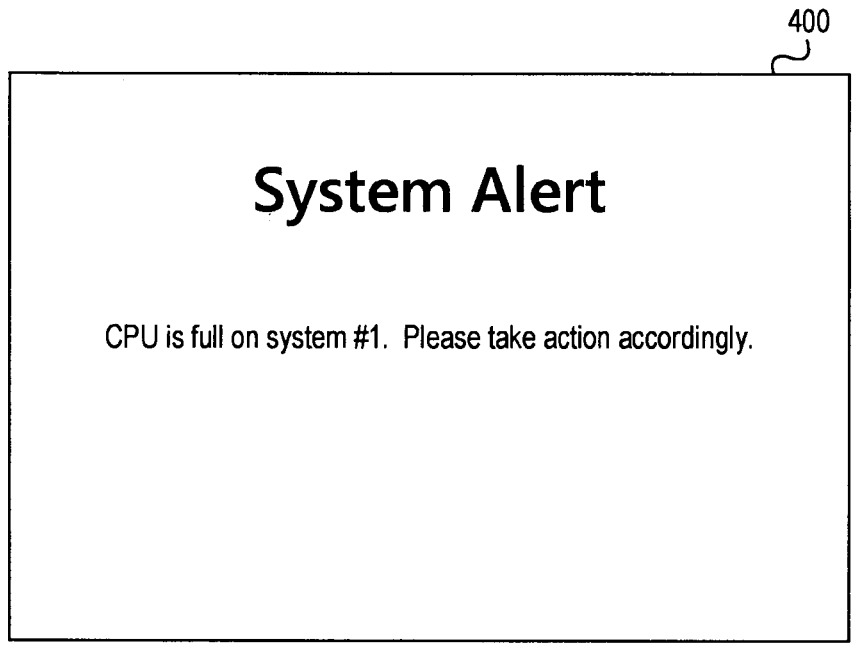
FIGS. 4-6 depict illustrative user interfaces for matching multiple featureless images across a time series for outage prediction and prevention in accordance with one or more example embodiments.

In some instances, the outage prediction and remediation platform 102 may identify that the confidence level fails to meet or exceed a first confidence threshold. In these instances, the outage prediction and remediation platform 102 may send a graphical user interface similar to graphical user interface 400, which is shown in FIG. 4, to the user device 104. For example, based on a relatively low confidence that an identified corrective action may be effective (or a failure to identify any particular action at all) and/or that an identified system performance pattern matches a historical pattern, the outage prediction and remediation platform 102 may merely send a notification of the predicted failure and prompt for action to be taken accordingly.

Figure 5:
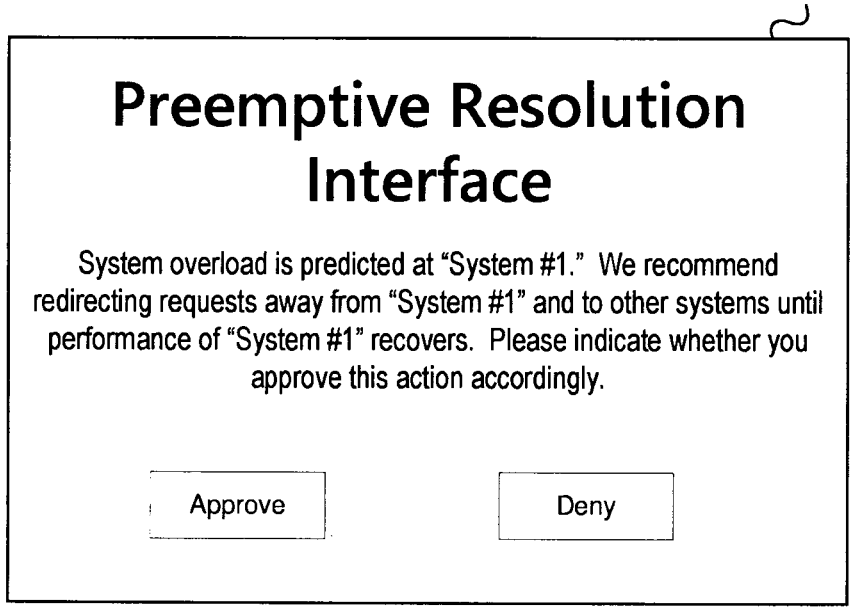

In some instances, the outage prediction and remediation platform 102 may identify that the confidence level meets or exceeds the first confidence threshold, but fails to meet or exceed a second confidence threshold (which may be higher than the first confidence threshold). In these instances, the outage prediction and remediation platform 102 may send a graphical user interface similar to graphical user interface 500, which is shown in FIG. 5, to the user device 104. For example, based on a medium level of confidence that an identified corrective action may be effective and/or that an identified system performance pattern matches a historical pattern, the outage prediction and remediation platform 102 may send a notification of the predicted failure and an identified remediating action. In this example, the outage prediction and remediation platform 102 may prompt a user to approve or reject the identified remediating action, and may automatically execute the action accordingly if approval is received.

Figure 6:
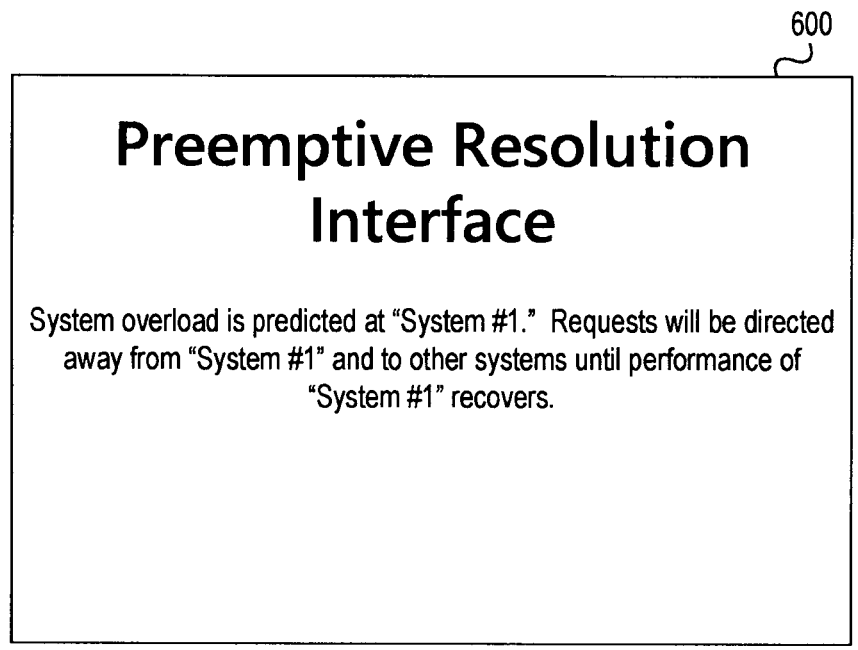

In some instances, the outage prediction and remediation platform 102 may identify that the confidence level meets or exceeds the second confidence threshold. In these instances, the outage prediction and remediation platform 102 may send a graphical user interface similar to graphical user interface 600, which is shown in FIG. 6, to the user device 104. For example, based on a relatively high level of confidence that an identified corrective action may be effective and/or that an identified system performance pattern matches a historical pattern, the outage prediction and remediation platform 102 may send a notification of the predicted failure, an identified remediating action, and an indication that the identified action will be automatically executed. In this example, the outage prediction and remediation platform 102 may also send commands directing performance of the identified action (which may, e.g., cause execution of the identified action). For example, the outage prediction and remediation platform 102 may send one or more commands directing a packet routing system, load balancing system, and/or other system to redirect requests, data, and/or information away from a first system (identified as overloaded) and towards one or more alternative systems, which may, e.g., cause the routing system to adjust the flow of information accordingly. In some instances, the outage prediction and remediation platform 102 may send the preemptive resolution commands to the user device 104 via the communication interface 113 and while the second wireless data connection is established.

With further reference to FIG. 2C, at step 212, the user device 104 may receive the preemptive resolution commands sent at step 211. For example, the user device 104 may receive the preemptive resolution commands while the second wireless data connection is established.

At step 213, based on or in response to the one or more preemptive resolution commands, the user device 104 may display a pre-emptive resolution interface (e.g., similar to graphical user interface 400 of FIG. 4, graphical user interface 500 of FIG. 5, graphical user interface 600 of FIG. 6, and/or otherwise). In some instances, such as where a graphical user interface similar to graphical user interface 500 of FIG. 5 is displayed, user selection of an interface element may trigger the execution of one or more remediation actions indicated in the interface. For example, if the user approves a proposed action, their selection may notify the outage prediction and remediation platform 102, which may, e.g., cause performance of the proposed action accordingly.

At step 214, the outage prediction and remediation platform 102 may update the image comparison model (e.g., the CNN and/or structural property comparison model) based on the telemetry state images, the classifications, identified likelihood of failure, an identified remediating action, and/or other information. In doing so, the outage prediction and remediation platform 102 may continue to refine the image comparison model using a dynamic feedback loop, which may, e.g., increase the accuracy and effectiveness of the model in predicting and remediating potential system failures.

For example, the outage prediction and remediation platform 102 may use the telemetry state images, the classifications, identified likelihood of failure, an identified remediating action, and/or other information to reinforce, modify, and/or otherwise update the image comparison model, thus causing the model to continuously improve (e.g., in terms of predicting and remediating system failures).

In some instances, the outage prediction and remediation platform 102 may continuously refine the image comparison model. In some instances, the outage prediction and remediation platform 102 may maintain an accuracy threshold for the image comparison model, and may pause refinement (through the dynamic feedback loops) of the model if the corresponding accuracy is identified as greater than the corresponding accuracy threshold. Similarly, if the accuracy fails to be equal or less than the given accuracy threshold, the outage prediction and remediation platform 102 may resume refinement of the model through the corresponding dynamic feedback loop.

Although only one instance of telemetry data is described herein, this is for illustrative purposes only, and any number of additional rounds of telemetry data may be received and analyzed by the image comparison model using similar techniques to those described above. For example, as illustrated in FIG. 9, an updated set of telemetry data may be received corresponding to time interval Y, and new images may be generated analyzed accordingly. In these instances, the likelihood of failure may be modified and/or otherwise adjusted based on newly received telemetry data. For example, the outage prediction and remediation platform 102 may receive additional telemetry data, which may, e.g., correspond to a different period of time than the original telemetry data. In these instances, the different period of time may overlap with the original period of time. For example, the original period of time may correspond to an hour, and the second period of time may be shifted thirty minutes into the future. Thus, the second half of the original period of time may overlap with the first thirty minutes of the original period of time. The outage prediction and remediation platform 102 may the generate corresponding telemetry state images, classify the images, identify a likelihood of failure, update the previously determined likelihood of failure, and take action accordingly as is described above with regard to the previous steps. The outage prediction and remediation platform 102 may continue to loop through this process to dynamically monitor system performance and act accordingly to predict and prevent system outages/failures.

By operating in this way, the outage prediction and remediation platform 102 may achieve benefits in both processing speed and computational power consumed to perform the failure prediction. For example, by creating telemetry state images that each correspond to time series representations of system performance for a given telemetry parameter, the outage prediction and remediation platform 102 may enable parallel image processing, classification, and scoring. This may offer advantages over a system in which each telemetry state image corresponds to snapshot of a particular moment in time (e.g., representing all telemetry parameters for the systems at that period of time), which may, e.g., need to perform image matching for the telemetry state images for each moment in time in sequence to identify patterns over time.

Figure 3:
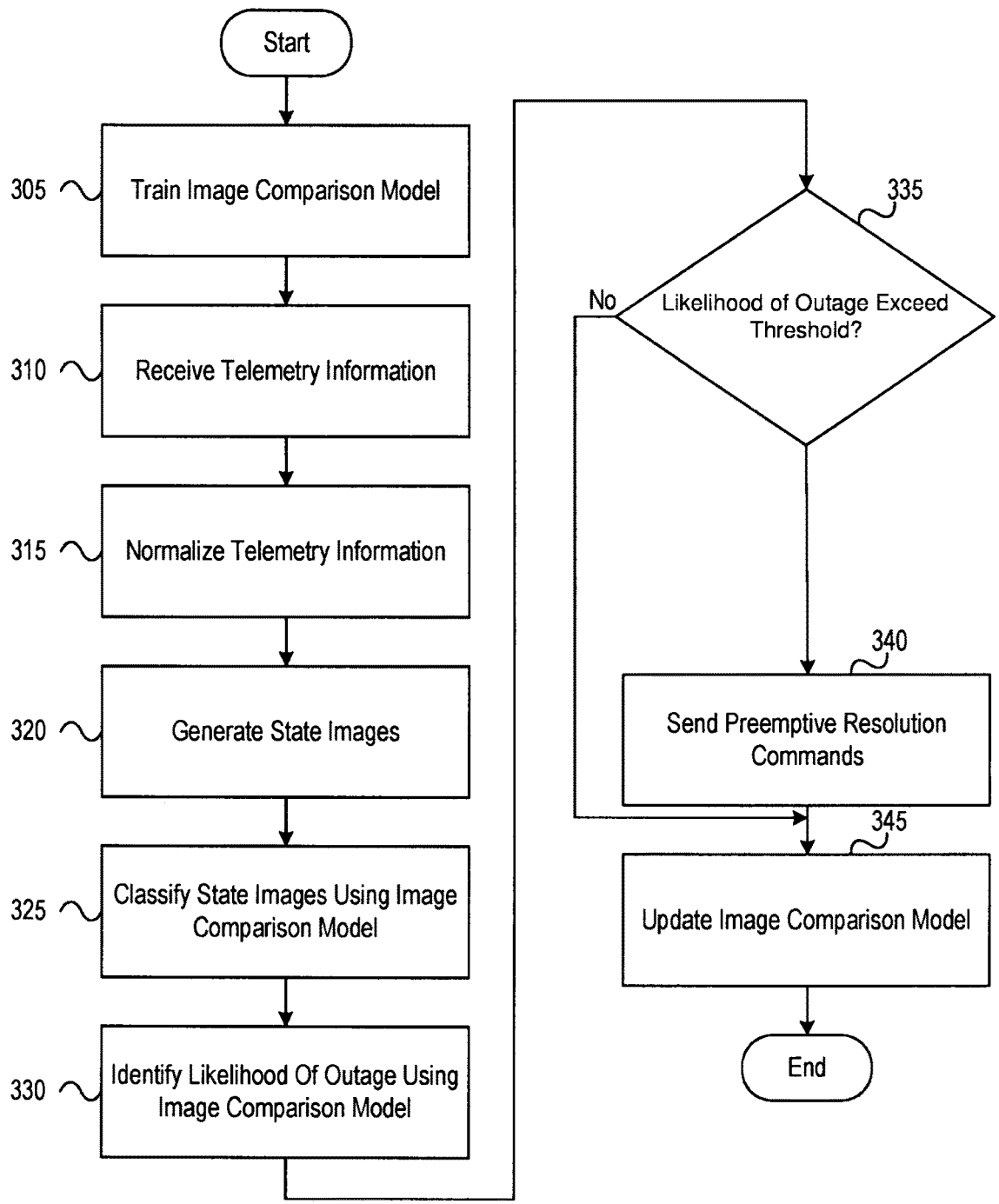
FIG. 3 depicts an illustrative method for matching multiple featureless images across a time series for outage prediction and prevention in accordance with one or more example embodiments.

FIG. 3 depicts an illustrative method for matching multiple featureless images across a time series for outage prediction and prevention in accordance with one or more example embodiments. Referring to FIG. 3, at step 305, a computing platform comprising one or more processors, memory, and a communication interface may train an image comparison model. At step 310, the computing platform may receive telemetry data. At step 315, the computing platform may normalize the telemetry data. At step 320, the computing platform may generate state images based on the normalized initial telemetry data. At step 325, the computing platform may classify the state images using the image comparison model. At step 330, the computing platform may output a likelihood of failure/outage using the image comparison model. At step 335, the computing platform may identify whether or not a likelihood of failure/outage threshold is exceeded. If so, the computing platform may proceed to step 340 to send preemptive resolution commands. The process may then proceed to step 345 to update the image comparison model. If the likelihood of failure/outage threshold is not exceeded at step 335, the computing platform may proceed to step 345 to update the image comparison model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train an image comparison model to predict system failure for technology infrastructure based on telemetry state images, each telemetry state image depicting change in a respective telemetry parameter for a plurality of computing systems of the technology infrastructure over time;
      receive telemetry data for the plurality of computing systems over a period of time;
      generate, based on the telemetry data and for each parameter represented in the telemetry data, a telemetry state image, wherein each telemetry state image:
         plots the period of time on an x axis,
         plots the plurality of computing systems on a y axis, and
         is specific to a respective parameter represented in the telemetry data;
      classify, using the image comparison model and using parallel processing, the telemetry state images;
      identify, using the parallel processing and based on the classifications of the telemetry state images, a likelihood of failure for the technology infrastructure; and
      send, based on the likelihood of failure for the technology infrastructure, one or more preemptive resolution commands causing modification of operations at one or more of the plurality of computing systems to prevent a predicted failure.

2. The computing platform of claim 1, wherein training the image comparison model comprises training the image comparison model to classify input telemetry data state images as matching historical telemetry state images.

3. The computing platform of claim 2, wherein the historical telemetry state images are labelled based on historical failures corresponding to the respective historical telemetry state images.

4. The computing platform of claim 3, wherein training the image comparison model comprises training the image comparison model to identify the likelihood of failure of the technology infrastructure based on the labelled historical telemetry state images.

5. The computing platform of claim 1, wherein the image comparison model comprises one or more of: a deep learning model or a structural property comparison model.

6. The computing platform of claim 5, wherein the deep learning model comprises a convolutional neural network (CNN).

7. The computing platform of claim 5, wherein the structural property comparison model is configured to compare one or more of: a number of peaks and troughs, a total area of the peaks and the troughs, a center of gravity, a moment, or a spatial frequency.

8. The computing platform of claim 1, wherein the memory stores additional computer readable instructions that, when executed by the at least one processor, cause the computing platform to:
   compare the likelihood of failure to a failure threshold, wherein sending the one or more preemptive resolution commands causing modification of the operations at one or more of the plurality of computing systems to prevent the predicted failure is in response to identifying that the likelihood of failure meets or exceeds the failure threshold.

9. The computing platform of claim 1, wherein sending the one or more preemptive resolution commands comprises directing a load management server associated with the one or more of the plurality of computing systems to redirect incoming requests away from the one or more of the plurality of computing systems.

10. The computing platform of claim 1, wherein sending the one or more preemptive resolution commands comprises directing a user device to display a recommended solution to avoid the predicted failure along with a prompt for whether or not the recommended solution should be executed.

11. The computing platform of claim 10, wherein the memory stores additional computer readable instructions that, when executed by the at least one processor, cause the computing platform to:
   receive user input accepting the recommended solution; and
   execute, in response to receiving the user input, the recommended solution.

12. The computing platform of claim 1, wherein the memory stores additional computer readable instructions that, when executed by the at least one processor, cause the computing platform to:
   receive additional telemetry data for the plurality of computing systems over a second period of time, wherein the second period of time includes a portion of the period of time and an amount of time occurring after the period of time;
   generate, based on the additional telemetry data and for each of the parameters, an additional telemetry state image, wherein each additional telemetry state image comprises a time series representation of the respective parameters for the plurality of computing systems over the second period of time;
   classify, using the image comparison model and using the parallel processing, the additional telemetry state images; and
   update, using the parallel processing and based on the classifications of the additional telemetry state images, the likelihood of failure for the technology infrastructure.

13. The computing platform of claim 1, wherein the parallel processing comprises:

classifying, in parallel and at substantially a same time, the telemetry state images for each of the parameters; and identifying, in parallel and at substantially the same time, the likelihood of failure based on each of the classifications.

14. A method comprising:

at a computing platform comprising at least one processor, a communication interface, and memory:

training an image comparison model to predict system failure for technology infrastructure based on telemetry state images, each telemetry state image depicting change in a respective telemetry parameter for a plurality of computing systems of the technology infrastructure over time;

receiving telemetry data for the plurality of computing systems over a period of time;

generating, based on the telemetry data and for each parameter represented in the telemetry data, a telemetry state image, wherein each telemetry state image:

plots the period of time on an x axis, plots the plurality of computing systems on a y axis, and is specific to a respective parameter represented in the telemetry data;

classifying, using the image comparison model and using parallel processing, the telemetry state images;

identifying, using the parallel processing and based on the classifications of the telemetry state images, a likelihood of failure for the technology infrastructure; and sending, based on the likelihood of failure for the technology infrastructure, one or more preemptive resolution commands causing modification of operations at one or more of the plurality of computing systems to prevent a predicted failure.

15. The method of claim 14, wherein training the image comparison model comprises training the image comparison model to classify input telemetry data state images as matching historical telemetry state images.

16. The method of claim 15, wherein the historical telemetry state images are labelled based on historical failures corresponding to the respective historical telemetry state images.

17. The method of claim 16, wherein training the image comparison model comprises training the image comparison model to identify the likelihood of failure of the technology infrastructure based on the labelled historical telemetry state images.

18. The method of claim 14, wherein the image comparison model comprises one or more of: a deep learning model or a structural property comparison model.

19. The method of claim 18, wherein the deep learning model comprises a convolutional neural network (CNN).

20. One or more non-transitory computer-readable media storing instructions that, when executed by a computing platform comprising at least one processor, a communication interface, and memory, cause the computing platform to:

train an image comparison model to predict system failure for technology infrastructure based on telemetry state images, each telemetry state image depicting change in a respective telemetry parameter for a plurality of computing systems of the technology infrastructure over time;

receive telemetry data for the plurality of computing systems over a period of time;

generate, based on the telemetry data and for each parameter represented in the telemetry data, a telemetry state image, wherein each telemetry state image:

plots the period of time on an x axis, plots the plurality of computing systems on a y axis, and is specific to a respective parameter represented in the telemetry data;

classify, using the image comparison model and using parallel processing, the telemetry state images;

identify, using the parallel processing and based on the classifications of the telemetry state images, a likelihood of failure for the technology infrastructure; and send, based on the likelihood of failure for the technology infrastructure, one or more preemptive resolution commands causing modification of operations at one or more of the plurality of computing systems to prevent a predicted failure.

* * * * *